United States Patent

Huang et al.

(10) Patent No.: US 10,104,205 B2
(45) Date of Patent: Oct. 16, 2018

(54) FLEXIBLE DATA PACKET INFORMATION MAPPING AND MODIFICATION

(71) Applicant: MediaTek Inc., Hsinchu (TW)

(72) Inventors: Chun-Kai Huang, Hsinchu (TW);
Yi-Hung Chen, Yilan County (TW);
Cheng-Ying Yu, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 182 days.

(21) Appl. No.: 14/925,913

(22) Filed: Oct. 28, 2015

(65) Prior Publication Data

US 2016/0050299 A1 Feb. 18, 2016

(51) Int. Cl.
*H04L 29/06* (2006.01)

(52) U.S. Cl.
CPC .............. *H04L 69/22* (2013.01); *H04L 69/08* (2013.01)

(58) Field of Classification Search
CPC ...................................................... H04L 69/22
See application file for complete search history.

(56) References Cited

U.S. PATENT DOCUMENTS

| | | | | |
|---|---|---|---|---|
| 6,687,742 B1 * | 2/2004 | Iwazaki | ............... | G06Q 10/107 358/402 |
| 6,961,812 B2 * | 11/2005 | Bjork | ................. | G11B 20/1251 369/47.1 |
| 7,463,630 B2 * | 12/2008 | Lee | ....................... | H04L 49/351 370/389 |
| 7,643,494 B2 * | 1/2010 | Lim | ..................... | H04L 12/5601 370/395.6 |
| 7,869,411 B2 * | 1/2011 | Tzeng | .................. | H04L 45/742 370/338 |
| 8,031,709 B2 * | 10/2011 | Alexander, Jr. | ..... | H04L 12/4645 370/389 |
| 8,228,932 B2 * | 7/2012 | Yu | .......................... | H04L 45/742 370/389 |
| 9,826,067 B2 * | 11/2017 | Bosshart | ................ | H04L 69/22 |
| 9,973,599 B2 * | 5/2018 | Lu | ........................... | H04L 69/22 |
| 2006/0187919 A1 * | 8/2006 | Lee | ........................ | H04L 45/742 370/389 |
| 2014/0241362 A1 * | 8/2014 | Bosshart | ................ | H04L 45/74 370/392 |
| 2015/0156288 A1 * | 6/2015 | Lu | ........................... | H04L 69/22 370/392 |
| 2016/0050148 A1 * | 2/2016 | Xu | ........................... | H04L 47/24 370/235 |

\* cited by examiner

*Primary Examiner* — Gregory B Sefcheck
(74) *Attorney, Agent, or Firm* — Han IP PLLC; Andy M. Han (57) ABSTRACT

Methods and apparatuses pertaining to flexible information mapping and modification of data packets are described. A method may involve receiving a data packet, modifying one or more attributes of the data packet, and outputting the modified data packet. In modifying the one or more attributes of the data packet, the method may involve extracting information from the data packet, the information including one or more user-defined fields (UDFs) in a header of the data packet. The method may also involve defining one or more source user-defined fields (SUDFs) according to at least one UDF of the one or more UDFs. The method may further involve performing one or more actions with respect to at least one SUDF of the one or more SUDFs.

25 Claims, 7 Drawing Sheets

FLEXIBLE DATA PACKET INFORMATION MAPPING AND MODIFICATION

TECHNICAL FIELD

The present disclosure is generally related to data networks and, more particularly, to flexible information mapping and modification of data packets.

BACKGROUND

Unless otherwise indicated herein, approaches described in this section are not prior art to the claims listed below and are not admitted to be prior art by inclusion in this section.

Data communication in a computer network, or data network, typically involves grouping all transmitted data into suitably sized blocks, herein referred to as "data packets" or "packets" interchangeably, which are transmitted via a medium that may be shared by multiple simultaneous communication sessions. Data packets are generally composed of a header and payload. Information in the header is used by networking hardware to direct the packet to its destination. The payload is extracted and used, e.g., by an application software.

Figure 7A:
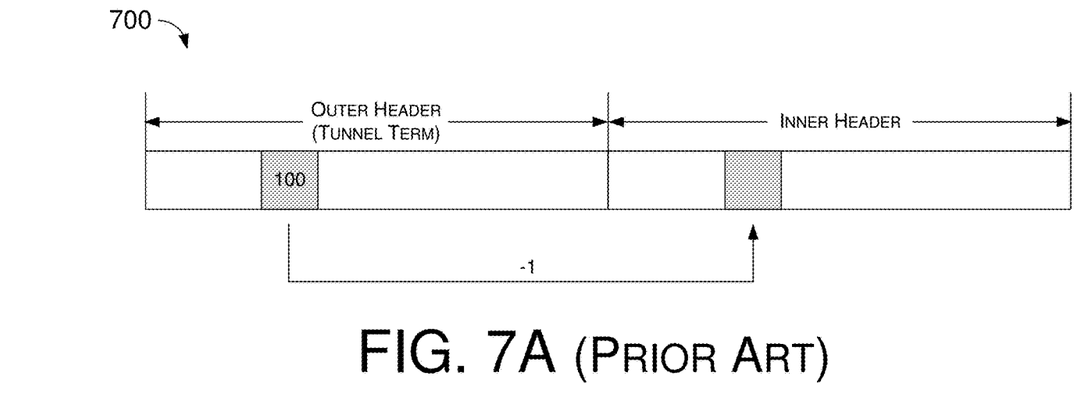
FIG. 7A is a block diagram of a conventional approach to data packet modification.
Figure 7B:
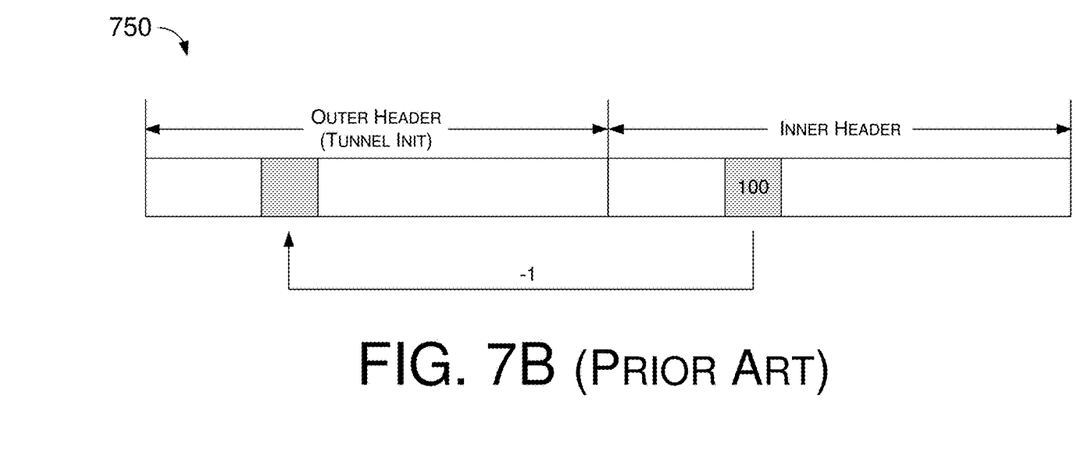
FIG. 7B is a block diagram of another conventional approach to data packet modification.

In today's complex networking environment, often times data packets may be transferred between network domains that utilize different formats and protocols. Under conventional approaches, data packets are typically modified in a fixed way, e.g., having the format of data packets transformed or otherwise converted from one format to another. Each of FIG. 7A and FIG. 7B illustrates a conventional approach to data packet modification. Referring to FIG. 7A, an ingress data packet 700 at a first networking apparatus may be modified by having a value copied from a given position or field in the outer header thereof and replicated in the same position or field in the inner header thereof. Referring to FIG. 7B, an ingress data packet 750 at a second networking apparatus, which may be data packet 700 after aforementioned modification, may be modified by having the value of the given position or field in the inner header thereof copied and replicated in the same position or field in the outer header thereof.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide a technique, method, apparatus, framework, scheme and system for modification of data packets in a flexible fashion. For instance, under implementations of the present disclosure, the content of a field in a data packet may be copied inwards and outwards (e.g., from an outer header to an inner header, and from the inner header to the outer header) in a flexible fashion. Advantageously, networking schemes and protocols that involve transferring of data packets between network domains that utilize different formats, such as software-defined networking, may benefit tremendously from implementations according to the present disclosure.

In one aspect, a method may involve receiving a data packet, modifying one or more attributes of the data packet, and outputting the modified data packet. In modifying the one or more attributes of the data packet, the method may involve extracting information from the data packet, the information including one or more user-defined fields (UDFs) in a header of the data packet. The method may also involve defining one or more source user-defined fields (SUDFs) according to at least one UDF of the one or more UDFs. The method may further involve performing one or more actions with respect to at least one SUDF of the one or more SUDFs.

In another aspect, a method may involve receiving a data packet, storing the data packet, and parsing the data packet to extract information from the data packet, the information including one or more UDFs in a header of the data packet. The method may also involve defining one or more SUDFs according to at least one UDF of the one or more UDFs and storing the one or more SUDFs. The method may further involve processing the one or more UDFs and the one or more SUDFs through multiple flow tables. The flow tables may be configured to identify one or more action commands and perform operations with respect to at least one SUDF of the one or more SUDFs according to the one or more action commands in a pipeline fashion. The method may additionally involve storing the one or more action commands, modifying one or more attributes of the data packet according to the stored one or more action commands and the stored one or more SUDFs, and outputting the modified data packet.

In yet another aspect, an apparatus may include a packet switch. The packet switch may be configured to receive a data packet and output a modified version of the data packet. The packet switch may include a parser, a memory device, a command collector, a packet buffer, a rewrite data vector module, and a packet modifier. The parser may be configured to parse the data packet to extract information from the data packet, the information including one or more UDFs in a header of the data packet. The parser may be also configured to define one or more SUDFs according to at least one UDF of the one or more UDFs. The memory device may be configured to store multiple flow tables. The flow tables may be configured to identify one or more action commands and perform operations with respect to at least one SUDF of the one or more SUDFs according to the one or more action commands in a pipeline fashion. The command collector may be configured to receive and store the one or more action commands from the flow tables. The packet buffer may be configured to store the data packet. The rewrite data vector module may be configured to receive and store the one or more SUDFs from the parser. The packet modifier may be coupled to receive the data packet, the one or more action commands and the one or more SUDFs from the packet buffer, the command collector and the rewrite data vector, respectively. The packet modifier may be configured to modify one or more attributes of the data packet according to the one or more action commands and the one or more SUDFs to provide the modified version of the data packet.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Overview

Figure 1:
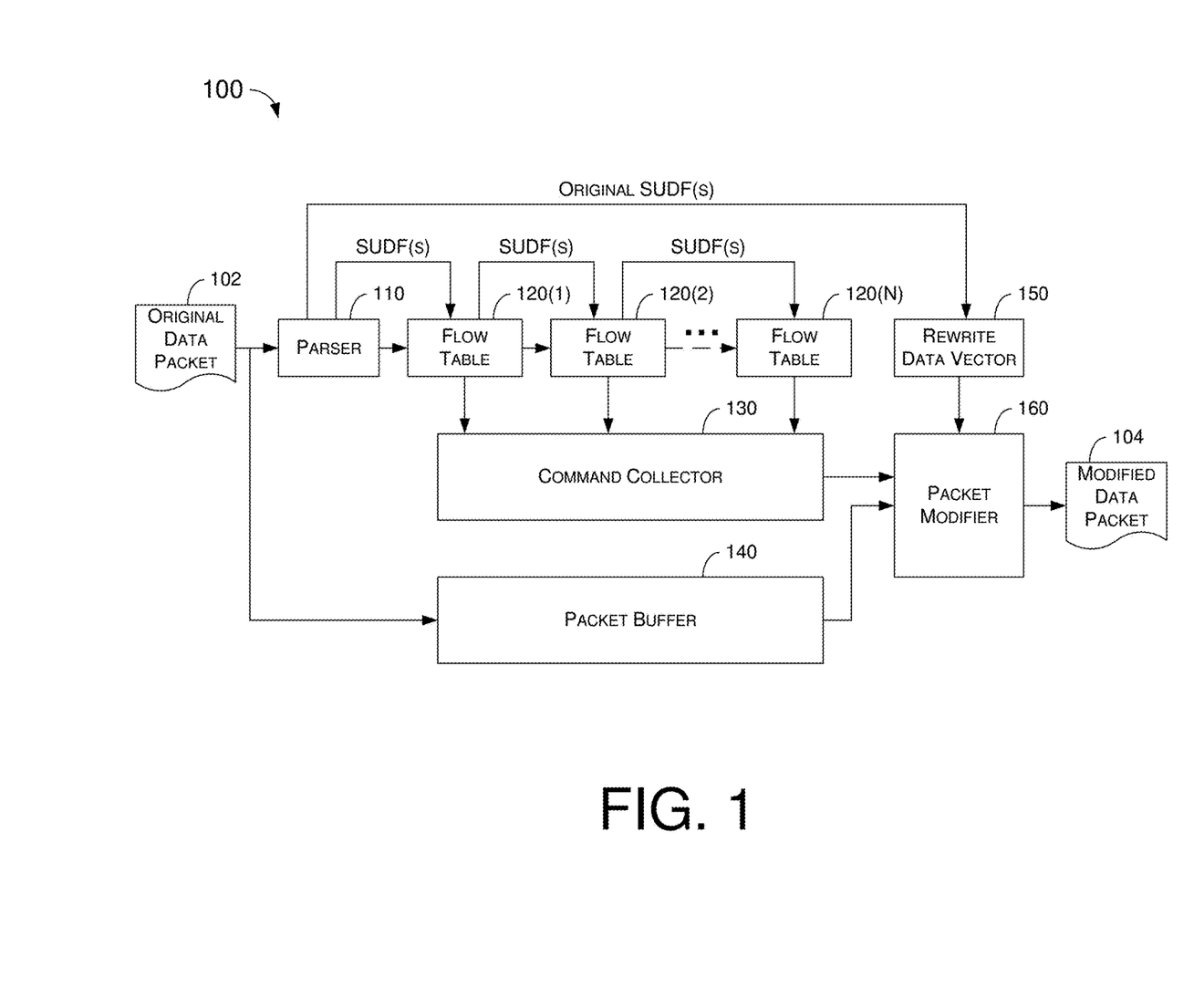
FIG. 1 is a block diagram of an example architecture in accordance with an implementation of the present disclosure.

FIG. 1 illustrates an example architecture 100 in accordance with an implementation of the present disclosure. Example architecture 100 may be implemented in a packet switch and/or in a hardware form. Example architecture 100 may include a parser 110, a pipeline of multiple flow tables 120(1)-120(N) with N being a positive integer greater than 1, a command collector 130, a packet buffer 140, a rewrite data vector 150 and a packet modifier 160. Example architecture 100 may receive one or more ingress data packets, including an original data packet 102 as shown in FIG. 1, and output one or more egress data packets, including a modified data packet 104 as shown in FIG. 1. Original data packet 102 may be a multi-layer packet with a tunnel header or simply a single-layer packet. Example architecture 100 may also include a traffic manager which is not shown in FIG. 1 for simplicity so as to avoid obscuring the illustration.

The pipeline of flow tables 120(1)-120(N) may be arranged to receive information in a serial or pipeline fashion, e.g., according to a process performed by an execution of a set of instructions in accordance with the OpenFlow protocol. That is, a first flow table 120(1) may be the first flow table among the pipeline of flow tables 120(1)-120(N) to receive information, followed by a second flow table 120(2), followed by a third flow table 120(3) and so forth, until the last flow table 120(N) of the pipeline of flow tables 120(1)-120(N). More detailed description pertaining to the operations of the pipeline of flow tables 120(1)-120(N) is provided below.

Parser 110 may be configured with one or more source user-defined fields (SUDFs). The one or more SUDFs may define one or more source user-defined fields in an outer header and/or an inner header of a data packet. In example architecture 100, one or more meta signals may be provided to traverse through the pipeline of flow tables 120(1)-120(N). The quantity of the one or more meta signals may be equal to the quantity of the one or more SUDFs. In some implementations, the one or more SUDFs may include, for example, an inner TTL_SUDF, an outer TTL_SUDF, an inner PCP_DEI_SUDF, an outer PCP_DEI_SUDF, an inner DSCP_ECN_SUDF, an outer DSCP_ECN_SUDF, multiple (e.g., four) inner customized SUDFs and multiple (e.g., four) outer customized SUDFs.

Example architecture 100 may also utilize a number of action commands for operations with respect to the one or more SUDFs. In some implementations, one or more action commands may pertain to the values of a given SUDF, while one or more other action commands may pertain to what to do with respect to a given SUDF (or the value thereof). As an example, action command SET_SUDF may be configured to set a value of a given SUDF, action command DECREASE_SUDF may be configured to decrease a value of a given SUDF, and action command INCREASE_SUDF may be configured to increase a value of a given SUDF. As another example, action command SET_BY_SUDF may be configured to set a value of a given SUDF to be the value of a given user-defined field (UDF) of a data packet. As a further example, action command PUSH_BY_SUDF may be configured to push or otherwise insert a given SUDF to a given UDF of a data packet, thereby adding one UDF to the data packet and increasing the length of the data packet.

When original data packet 102 enters example architecture 100, original data packet 102 may be received by packet buffer 140 and parser 110. Packet buffer 140 may store original data packet 102 therein before providing original data packet 102 to packet modifier 160 for modification. Upon receiving original data packet 102, parser 110 may parse original data packet 102 to extract one or more UDFs from original data packet 102 and provide the one or more extracted UDFs to the pipeline of flow tables 120(1)-120(N). For instance, parser 102 may provide the one or more UDFs to first flow table 120(1), which may perform modification(s) on any of the one or more UDFs and then provide the one or more UDFs to second flow table 120(2), which may in turn do the same such that the one or more UDFs may traverse through the pipeline of flow tables 120(1)-120(N) and may be modified along the way through the last flow table 120(N). In implementations of the present disclosure, value(s) of the extracted one or more UDFs may respectively define the value(s) of a set of one or more original (unmodified) SUDFs, and parser 110 may provide the one or more original SUDFs as data sources to the pipeline of flow tables 120(1)-120(N). For instance, parser 102 may provide the one or more original SUDFs to first flow table 120(1), which may perform modification(s) on any of the one or more original SUDFs and provide the one or more SUDFs to second flow table 120(2), which may in turn do the same such that the one or more SUDFs may traverse through the pipeline of flow tables 120(1)-120(N) and may be modified along the way through the last flow table 120(N). Additionally, parser 110 may provide the one or more original (unmodified) SUDFs to rewrite data vector 150 which may in turn store the one or more original SUDFs therein. Rewrite data vector 150 may provide the one or more original SUDFs to packet modifier 160 as data source when packet modifier 160 is ready to modify original data packet 102.

Each of flow tables 120(1)-120(N) may, based on the one or more extracted UDFs received from parser 110, look up, find or otherwise identify one or more action commands. Each of flow tables 120(1)-120(N) may provide the respectively identified one or more action commands to command collector 130 which may in turn collect and store action commands received from flow tables 120(1)-120(N). Each of flow tables 120(1)-120(N) may also take action(s) based on the respectively identified one or more action commands, including modifying the value of at least one UDF of the one or more UDFs and the value of at least one SUDF of the one or more SUDFs. Each of flow tables 120(1)-120(N) may further provide the one or more SUDFs (at least one of which may be modified) to its subsequent flow table. For instance, after first flow table 120(1) performs modification (s) on a SUDF named SUDF_0, first flow table 120(1) may provide SUDF_0 (and other SUDFs, if any) to second flow table 120(2). Likewise, after second flow table 120(2) performs modification(s) on the SUDF named SUDF_0 and/or another SUDF, second flow table 120(2) may provide SUDF_0 and/or the another SUDF (and other SUDFs, if any) to third flow table 120(3). This process may proceed in a pipeline fashion until the one or more SUDFs are processed by the last flow table 120(N), where at least one SUDF of the one or more SUDFs may be modified thereby.

For illustrative purpose as an example, when an action command is SET_SUDF, DECREASE_SUDF or INCREASE_SUDF, the respective flow table of flow tables 120(1)-120(N) may set the value of a given SUDF identified by the action command, decrease the value of the given SUDF or increase the value of the given SUDF, respectively. As another example, when an action command is SET_BY_SUDF, the respective flow table of flow tables 120(1)-120(N) may write the value of a given SUDF identified by the action command into a given UDF identified by the action command. As a further command, when an action command is PUSH_BY_SUDF, the respective flow table of flow tables 120(1)-120(N) may push or otherwise insert the value of a given SUDF identified by the action command into a given UDF identified by the action command. The UDF(s) thus modified by the one or more action commands by a flow table of flow tables 120(1)-120(N) may then be provided to the subsequent flow table in the pipeline (e.g., from flow table 120(K) to flow table 120(K+1) with K being a positive integer equal to or greater than 1 and no greater than N−1).

Packet modifier 160 may read from command collector 130 the collected action commands there are stored in command collector 130. Packet modifier 160 may also receive the data source from rewrite data vector 150 and original data packet 102 from packet buffer 140. Packet modifier 160 may modify original data packet 102 according to the collected action commands and the data source. In an event that a given action command is SET_SUDF, DECREASE_SUDF or INCREASE_SUDF, packet modifier 160 may modify the value of a given SUDF. In an event that a given action command is SET_BY_SUDF, packet modifier 160 may write the value of a given SUDF into an identified position within the data packet, e.g., mapping the position according to the respective UDF. In an event that a given action command is PUSH_BY_SUDF, packet modifier 160 may push or otherwise insert the value of a given SUDF into an identified position within the data packet, e.g., mapping the position according to the respective UDF. After performing one or more modifications in accordance with the collected action commands and data source, i.e., the original one or more SUDFs, packet modifier 160 may output the modified data packet 104 as an output of example architecture 100.

Figure 2:
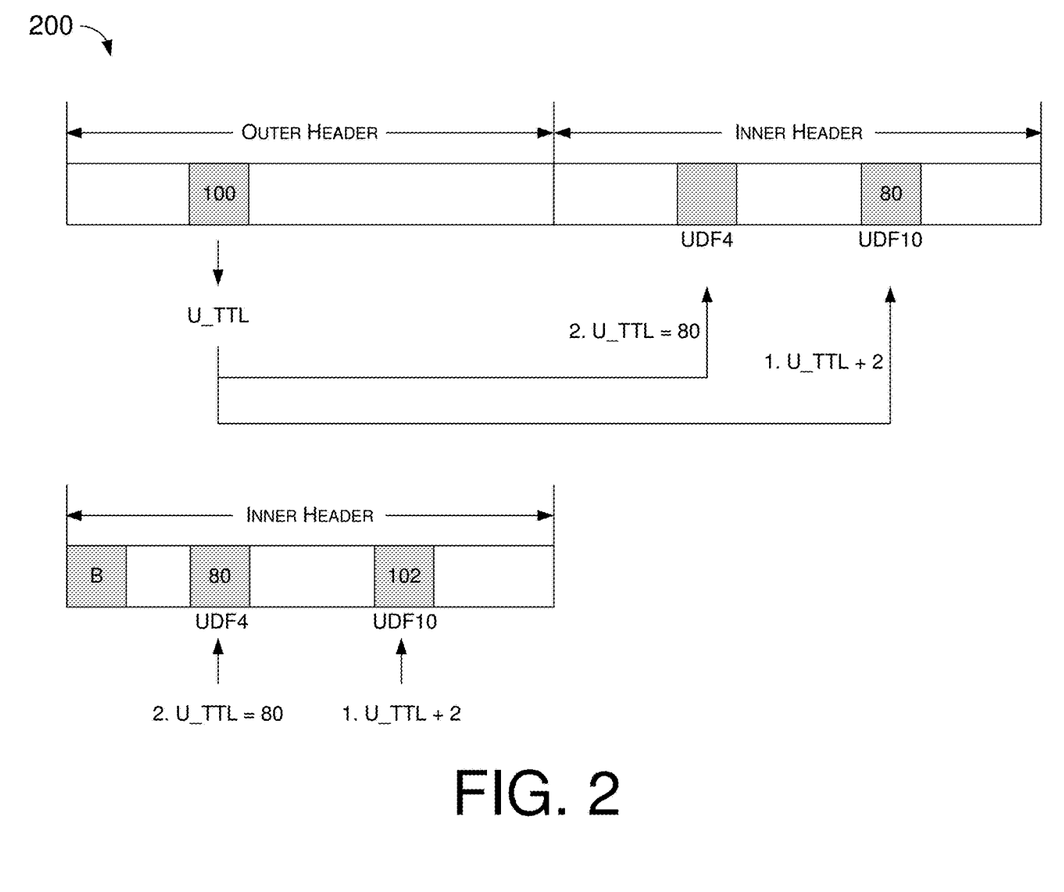
FIG. 2 is a diagram of an example operation in accordance with an implementation of the present disclosure.

FIG. 2 illustrates an example operation 200 in accordance with an implementation of the present disclosure. For illustrative purpose and not limiting the scope of the present disclosure, example operation 200 is described below in the context of example architecture 100. In the example shown in FIG. 2, U_TTL is a user-defined field in the outer header and not a conventional layer 3 (L3) TTL. The value of the user-defined field named U_TTL, which is 100 in this example, may be assigned to a source user-defined field named SUDF_0. In example operation 200, first flow table 120(1) may be configured to look up or otherwise identify one or more action commands associated with the user-defined field UDF10, with a matching value of 80. In this example, the associated action commands may be INCREASE_SUDF(SUDF_0, 2) and SET_BY_SUDF (SUDF_0, UDF10). In example operation 200, second flow table 120(2) may be configured to look up or otherwise identify one or more action commands associated with the user-defined field UDF10, with a matching value of 102. In this example, the associated action commands may be SET_SUDF(SUDF_0, 80) and SET_BY_SUDF(SUDF_0, UDF4). In this example, an egress data packet may include two modified positions. Specifically, the value of the user-defined field UDF4 is modified to be 80 and the value of the user-defined field UDF10 is modified to 102 (=100+2).

Under example operation 200, parser 110 may be configured to obtain the value of SUDF_0 from the user-defined field of U_TTL of an ingress data packet, e.g., original data packet 102. First flow table 120(1) may be configured with an entry that stipulates the following: in an event that the value of UDF10 is 80, then look up the action commands INCREASE_SUDF(SUDF_0, 2) and SET_BY_SUDF (SUDF_0, UDF10). Second flow table 120(2) may be configured with an entry that stipulates the following: in an event that the value of UDF10 is 102, then look up the action commands SET_SUDF(SUDF_0, 80) and SET_BY_SUDF (SUDF_0, UDF4).

Accordingly, when an ingress data packet, e.g., original data packet 102, enters example architecture 100, parser 110 may, based on the configurations, extract the value 100 from U_TTL and accordingly set the value of SUDF_0 to 100. Parser 110 may also provide one or more SUDFs, including SUDF_0, to first flow table 120(1) as well as rewrite data vector 150. Parser 110 may further extract the values of user-defined fields UDF0-UDFM (assuming the quantity of UDFs is M which is a positive integer greater than 1) and provide these extracted values of UDF0-UDFM to the pipeline of flow tables 120(1)-120(N) for processing.

In first flow table 120(1), given that the value of UDF10 is 80 initially, there is a match with the aforementioned entry in first flow table 120(1). Accordingly, the associated action commands are INCREASE_SUDF(SUDF_0, 2) and SET_BY_SUDF(SUDF_0, UDF10). First flow table 120(1) may then perform the actions of adding 2 to the value of SUDF_0 (which is 100 initially), to arrive at a value of 102, and writing the value 102 into UDF10. Moreover, example architecture 100 may store the action commands INCREASE_SUDF(SUDF_0, 2) and SET_BY_SUDF (SUDF_0, UDF10) in command collector 130.

In second flow table 120(2), given that the modified value of UDF10 is 102, there is a match with the aforementioned entry in second flow table 120(2). Accordingly, the associated action commands are SET_SUDF(SUDF_0, 80) and SET_BY_SUDF(SUDF_0, UDF4). Second flow table 120 (2) may then perform the actions of setting the value of SUDF_0 to 80 and writing the value 80 into UDF4. Moreover, example architecture 100 may store the action commands SET_SUDF(SUDF_0, 80) and SET_BY_SUDF (SUDF_0, UDF4) in command collector 130.

Subsequently, packet modifier 160 may read the original value of SUDF_0, which is 100, from rewrite data vector 150. Packet modifier 160 may also read, fetch or otherwise obtain original data packet 102 from packet buffer 140 and action commands from command collector 130. Packet modifier 160 may then modify the original data packet 102 in accordance with the action commands stored, namely:

INCREASE_SUDF(SUDF_0, 2), SET_BY_SUDF (SUDF_0, UDF10), SET_SUDF(SUDF_0, 80) and SET_BY_SUDF(SUDF_0, UDF4). In particular, packet modifier 160 may write the value 102 (=100+2) into the position or field in original data packet 102 corresponding to UDF10, and then write the value 80 into the position or field in original data packet 102 corresponding to UDF4. After performing the modifications, packet modifier 160 may output the egress data packet as modified data packet 104.

Figure 3:
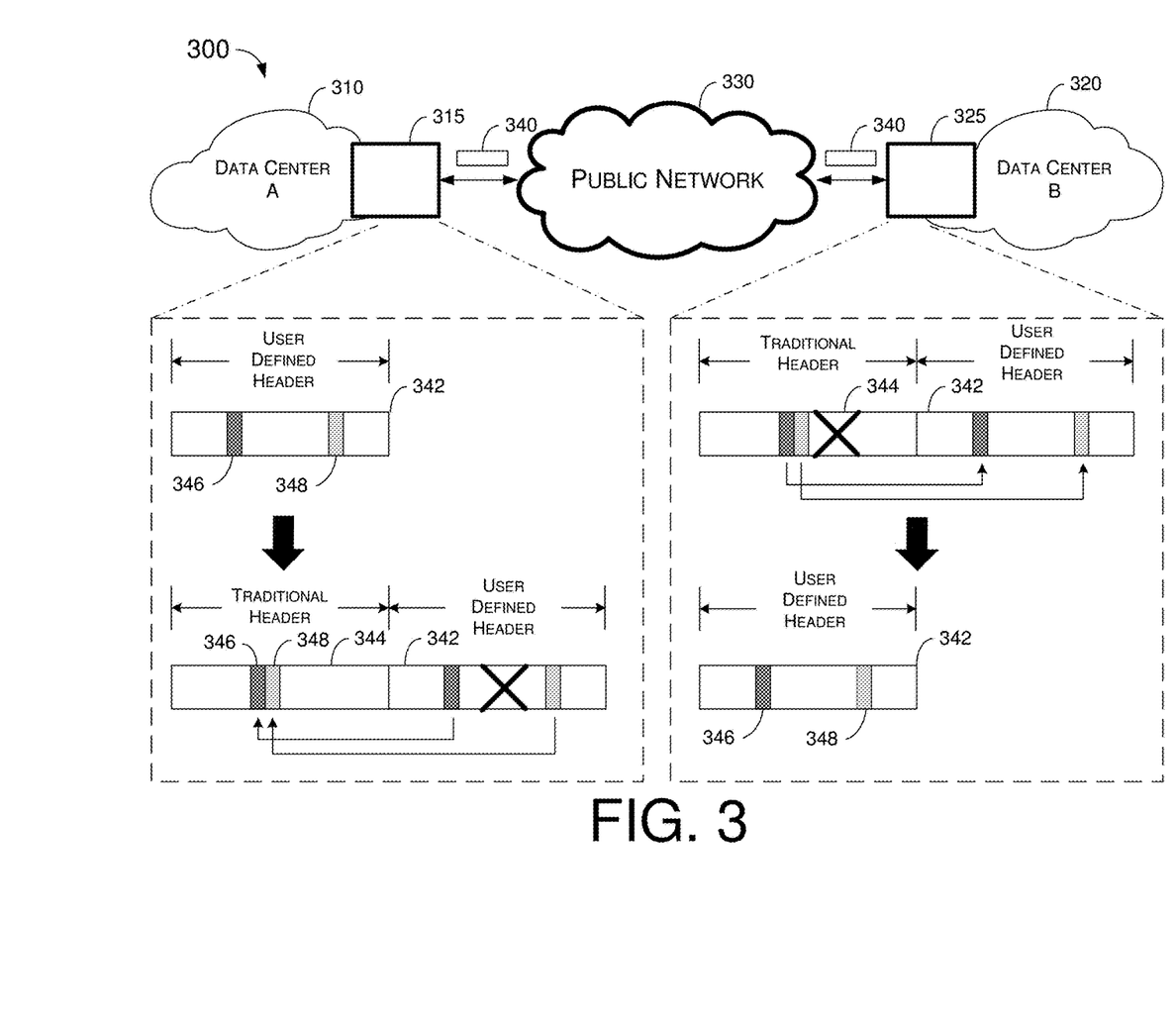
FIG. 3 is a diagram of an example scenario in accordance with an implementation of the present disclosure.

FIG. 3 illustrates an example scenario 300 in accordance with an implementation of the present disclosure. Example scenario 300 may involve two data centers, data center A 310 and data center B 320, which may be privately owned and/or operated by a business entity. Each of data center A 310 and data center B 320 may include one or more local area networks (LANs). Moreover, each of data center A 310 and data center B 320 may include one or more software-defined networks (SDNs). Data center A 310 and data center B 320 may be communicatively connected to each other via a public network 330, which may be, for example, a wide area network (WAN) or the Internet. Data center A 310 may be connected to public network 330 through a networking apparatus 315, which may be a type of network node such as an edge gateway. Data center B 320 may be connected to public network 330 through a network apparatus 325, which may also be a type of network node such as an edge gateway. Each of networking apparatus 315 and networking apparatus 325 may be configured to perform operations in accordance with various implementations of the present disclosure. For instance, example architecture 100 may be implemented in each of networking apparatus 315 and networking apparatus 325. Moreover, each of networking apparatus 315 and networking apparatus 325 may be configured to perform operations similar to example operation 200.

In example scenario 300, data packets transferred within each of data center A 310 and data center B 320 may be in a user-defined format. In contrast, public network 330 may only transfer data packets in the traditional format, e.g., with headers in a traditional header format. When a data packet 340 in the user-defined format is to be transferred from data center A 310 to data center B 320, networking apparatus 315 may perform key information mapping to transform or otherwise convert data packet 340 from the user-defined format to the traditional format (e.g., transforming or otherwise converting the header of data packet 340 from a user-defined header 342 to a traditional header 344). Correspondingly, networking apparatus 325 may perform reverse key information mapping to transform or otherwise convert data packet 340 from the traditional format to the user-defined format (e.g., transforming or otherwise converting the header of data packet 340 from traditional header 344 back to user-defined header 342).

For instance, on the source end, networking apparatus 315 may copy key information (e.g., values in a first field 346 and a second field 348) from user-defined header 342 to traditional header 344. Additionally, networking apparatus 315 may remove user-defined header 342 and transmit the data packet 340, having traditional header 344, to public network 330. On the destination end, when the data packet 340 reaches the edge of data center B 320, networking apparatus 325 may copy the key information (e.g., values in first field 346 and second field 348) from traditional header 344 to user-defined header 342. Moreover, networking apparatus 325 may remove traditional header 344 and transmit the data packet 340, having user-defined header 342, to data center B 320.

In converting data packet 340 from one format to the other (e.g., from the user-defined format to the traditional format, and from the traditional format to the user-defined format), each of networking apparatus 315 and networking apparatus 325 may perform operations described above with respect to example architecture 100 and example operation 200, as well as example apparatus 400 and example processes 500 and 600 described below. For instance, each of networking apparatus 315 and networking apparatus 325 may extract information from data packet 340. The extracted information may include one or more UDFs in the header of data packet 340. Each of networking apparatus 315 and networking apparatus 325 may also define one or more SUDFs according to at least one UDF of the one or more UDFs. Each of networking apparatus 315 and networking apparatus 325 may further perform one or more actions with respect to at least one SUDF of the one or more SUDFs. For instance, each of networking apparatus 315 and networking apparatus 325 may perform one or more of the following actions: setting a value of the at least one SUDF, increasing the value of the at least one SUDF, decreasing the value of the at least one SUDF, setting the value of the at least one SUDF as a value of a UDF of the one or more UDFs, and pushing the value of the at least one SUDF into a field in data packet 340.

Advantageously, in implementations in accordance with the present disclosure, one or more fields in a data packet may be copied inwards and outwards (e.g., from an outer header to an inner header, and from the inner header to the outer header) in a flexible fashion to modify the data packet. This novel feature may satisfy actual and potential needs of flexible modification of data packets in software-defined networking. Flexible modification of data packets in accordance with the present disclosure may enable copying or otherwise replicating the content of any field/position in a data packet to another field/position in the data packet, with or without modifying the value thereof.

Example Implementations

Figure 4:
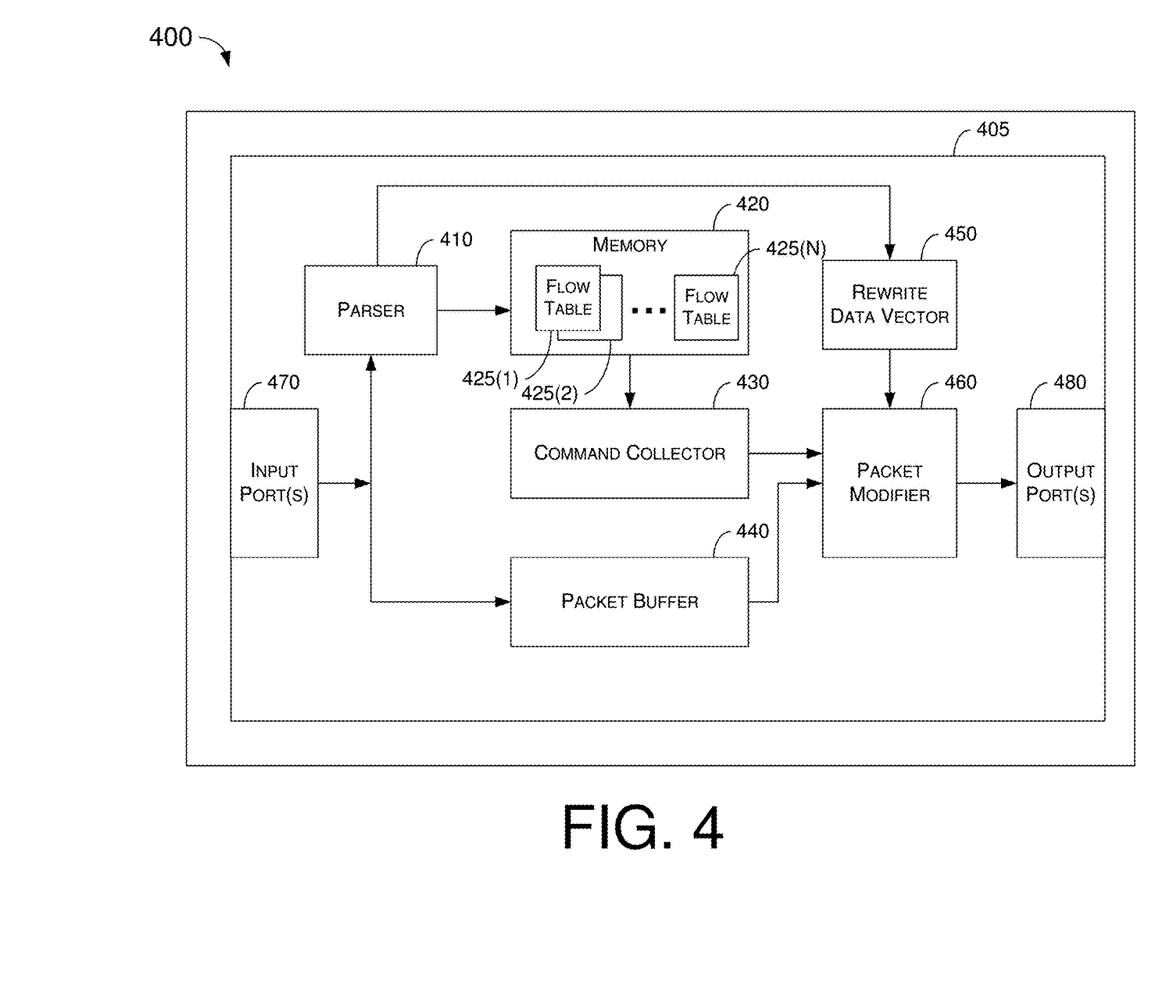
FIG. 4 is a block diagram of an example apparatus in accordance with an implementation of the present disclosure.

FIG. 4 illustrates an example apparatus 400 in accordance with an implementation of the present disclosure. Example apparatus 400 may perform various functions related to techniques, methods and systems described herein, including example operation 200 and example scenario 300 described above, as well as example processes 500 and 600 described below. Example apparatus 400 may be an implementation of example architecture 100. Moreover, example apparatus 400 may be implemented as a network node in a computer/data network such as, for example, a router or a gateway. Alternatively, example apparatus 400 may be implemented as a packet switch, e.g., in the form of a single integrated circuit (IC) chip or multiple IC chips, and may be implemented in a network node. Example apparatus 400 may include a number of hardware components implemented in the form of circuits having one or more of transistors, capacitors, resistors, inductors and/or memristors.

In the example shown in FIG. 4, example apparatus 400 may include a packet switch 405 having a number of hardware components such as a parser 410, a memory device 420, a command collector 430, a packet buffer 440, a rewrite data vector module 450 and a packet modifier 460. Additionally, packet switch 405 may include one or more input ports 470 and one or more output ports 480. The one or more input ports 470 may be configured to receive one or more ingress data packets. The one or more output ports 480 may be configured to output one or more egress data packets where at least one of the egress data packet may be a modified version of one of the ingress data packets.

Parser 410 may be configured to parse an ingress data packet to extract information from the ingress data packet. The extracted information may include one or more user-defined fields (UDFs) in a header of the ingress data packet. Parser 410 may also be configured to define one or more source user-defined fields (SUDFs) according to at least one UDF of the one or more UDFs as described above with respect to example architecture 100 and example operation 200.

Memory device 420 may be any type of random access memory (RAM), any type of ternary content addressable memory (TCAM), or any suitable memory device configured to store data and one or more sets of instructions which may be in the form of software, middleware or firmware modules. For instance, TCAM may be utilized to implement a TCAM flow table which may perform wildcard searches. In other words, an "all wildcard" entry may be set in the bottom of the TCAM table to perform default look-up result, search one or more missed entries, or both. Modules stored in memory device 420 may be executable by one or more processors 410 to perform a number of operations. In the example shown in FIG. 4, memory device 420 may store therein multiple flow tables 425(1)-425(N), with N being a positive integer greater than 1, which may be arranged to operate in a pipeline fashion. Flow tables 425(1)-425(N) may be configured to identify one or more action commands and perform operations with respect to at least one SUDF of the one or more SUDFs according to the one or more action commands in a pipeline fashion.

Command collector 430 may be configured to receive and store the one or more action commands from flow tables 425(1)-425(N).

Packet buffer 440 may be configured to store the ingress data packet.

Rewrite data vector module 450 configured to receive and store the one or more SUDFs from the parser.

Packet modifier 460 may be coupled to packet buffer 440, command collector 430 and rewrite data vector module 450 to receive the ingress data packet, the one or more action commands and the one or more SUDFs from packet buffer 440, command collector 430 and rewrite data vector 450, respectively. Packet modifier 460 may also be configured to modify one or more attributes of the ingress data packet according to the one or more action commands and the one or more SUDFs, and provide an egress data packet as a modified version of the ingress data packet.

In some implementations, in modifying the one or more attributes of the ingress data packet, packet modifier 460 may be configured to convert a format of the ingress data packet from a first format to a second format. In some implementations, in converting the format of the ingress data packet from the first format to the second format, packet modifier 460 may be configured to convert a format of a header of the ingress data packet from a first header format to a second header format.

In some implementations, in modifying the one or more attributes of the ingress data packet, packet modifier 460 may be configured to modify a format of the ingress data packet, a packet header of the ingress data packet, a length of the ingress data packet, or any combination thereof.

In some implementations, in defining the one or more SUDFs according to the at least one UDF of the one or more UDFs, parser 410 may be configured to set a value of a first SUDF of the one or more SUDFs based on a value of a first UDF of the one or more UDFs.

In some implementations, in performing the operations with respect to the at least one SUDF of the one or more SUDFs according to the one or more action commands, flow tables 425(1)-425(N) may be configured to perform one or more actions including, for example, setting a value of the at least one SUDF, increasing the value of the at least one SUDF, decreasing the value of the at least one SUDF, setting the value of the at least one SUDF as a value of a UDF of the one or more UDFs, and pushing the value of the at least one SUDF into a field in the ingress data packet.

In some implementations, in identifying the one or more action commands, in each of flow tables 425(1)-425(N), the respective flow table may determine whether there is a match between at least one UDF of the one or more UDFs and a respective predefined matching value associated with the flow table. Flow tables 425(1)-425(N) may also store at least one action command in response to a determination that there is at least one UDF of the one or more UDFs matching the respective predefined matching value.

Figure 5:
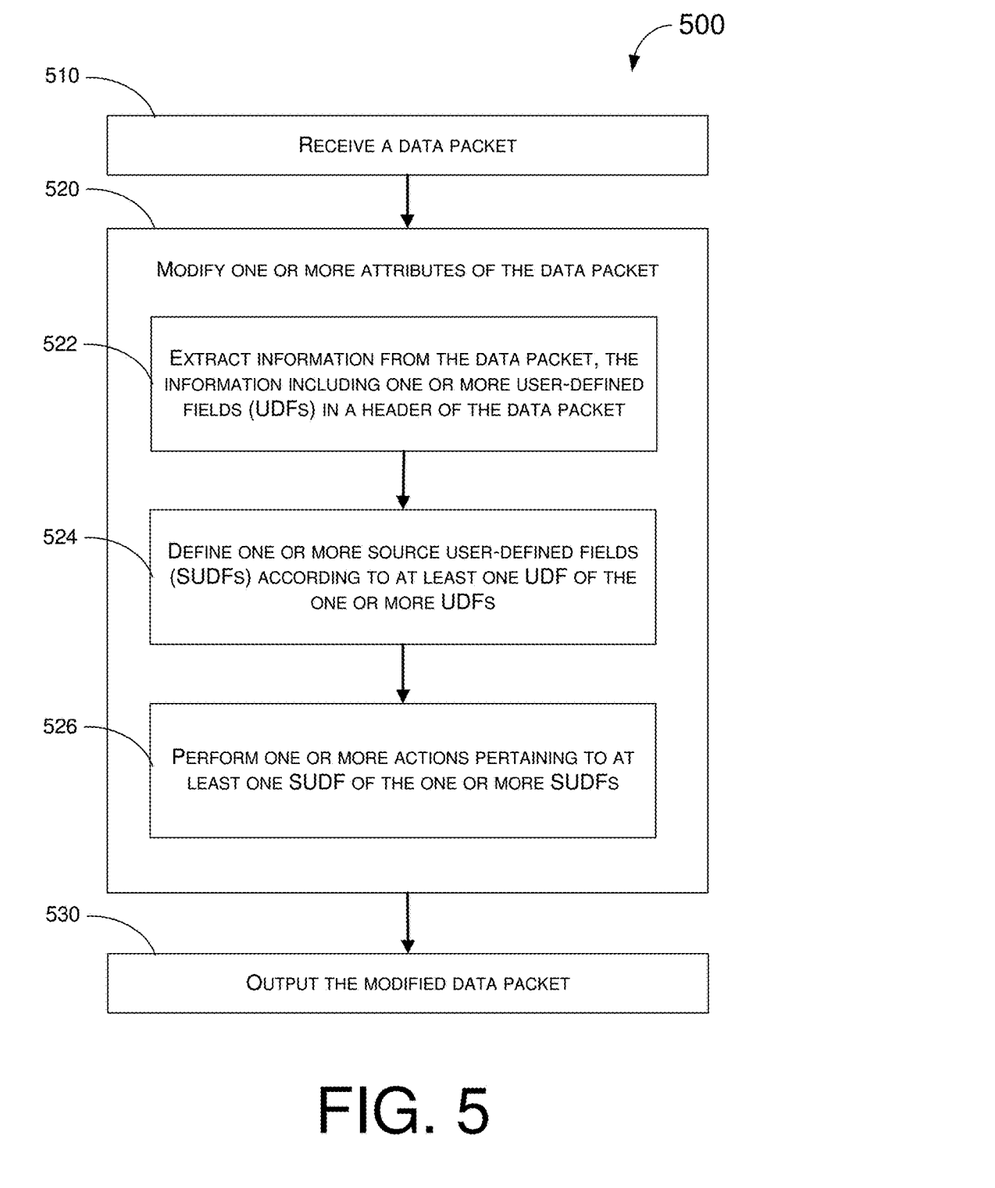
FIG. 5 is a flowchart of an example process in accordance with an implementation of the present disclosure.

FIG. 5 illustrates an example process 500 in accordance with an implementation of the present disclosure. Example process 500 may represent an aspect of implementing features of example architecture 100, example operation 200, example scenario 300 and/or example apparatus 400. Example process 500 may include one or more operations, actions, or functions as illustrated by one or more of blocks 510 and 520 as well as sub-blocks 522, 524 and 526. Although illustrated as discrete blocks, various blocks may be divided into additional blocks, combined into fewer blocks, or eliminated, depending on the desired implementation. Example process 500 may be implemented by example architecture 100 as well as example apparatus 400. Solely for illustrative purposes, the operations of example process 500 are described below in the context of example process 500 being performed by packet switch 405 of example apparatus 400. Example process 500 may begin at block 510.

At 510, example process 500 may involve packet switch 405 of example apparatus 400 receiving a data packet. Block 510 may be followed by block 520.

At 520, example process 500 may involve packet switch 405 modifying one or more attributes of the data packet. Block 520 may be followed by block 530.

At 530, example process 500 may involve packet switch 405 outputting the modified data packet.

Block 520 may include a number of sub-blocks to carry out the modification of the one or more attributes of the data packet, including sub-blocks 522, 524 and 526 and beginning at sub-block 522.

At 522, example process 500 may involve packet switch 405 extracting information from the data packet, the information including one or more UDFs in a header of the data packet. Sub-block 522 may be followed by sub-block 524.

At 524, example process 500 may involve packet switch 405 defining one or more SUDFs according to at least one UDF of the one or more UDFs. Sub-block 524 may be followed by sub-block 526.

At 526, example process 500 may involve packet switch 405 performing one or more actions with respect to at least one SUDF of the one or more SUDFs.

In some implementations, in modifying the one or more attributes of the data packet, example process 500 may involve packet switch 405 converting a format of the data packet from a first format to a second format. In some implementations, in converting the format of the data packet from the first format to the second format, example process 500 may involve packet switch 405 converting a format of a header of the data packet from a first header format to a second header format.

In some implementations, in modifying the one or more attributes of the data packet, example process 500 may involve packet switch 405 modifying at least one of a format, a packet header, or a length of the data packet.

In some implementations, in defining the one or more SUDFs according to the at least one UDF of the one or more UDFs, example process 500 may involve packet switch 405 setting a value of a first SUDF of the one or more SUDFs based on a value of a first UDF of the one or more UDFs.

In some implementations, in performing the one or more actions with respect to the at least one SUDF of the one or more SUDFs, example process 500 may involve packet switch 405 identifying one or more action commands. Additionally, example process 500 may involve packet switch 405 executing the one or more action commands with respect to the at least one SUDF. In some implementations, in executing the one or more action commands with respect to the at least one SUDF, example process 500 may involve packet switch 405 performing one or more actions including the following: setting a value of the at least one SUDF, increasing the value of the at least one SUDF, decreasing the value of the at least one SUDF, setting the value of the at least one SUDF as a value of a UDF of the one or more UDFs, and pushing the value of the at least one SUDF into a field in the data packet.

In some implementations, in identifying the one or more action commands, example process 500 may involve packet switch 405 processing the one or more UDFs and the one or more SUDFs through a pipeline of multiple flow tables. Additionally, in each of the flow tables, example process 500 may involve packet switch 405 determining whether there is a match between at least one UDF of the one or more UDFs and a respective predefined matching value associated with the flow table. Furthermore, example process 500 may involve packet switch 405 storing at least one action command in response to a determination that there is at least one UDF of the one or more UDFs matching the respective predefined matching value.

Figure 6:
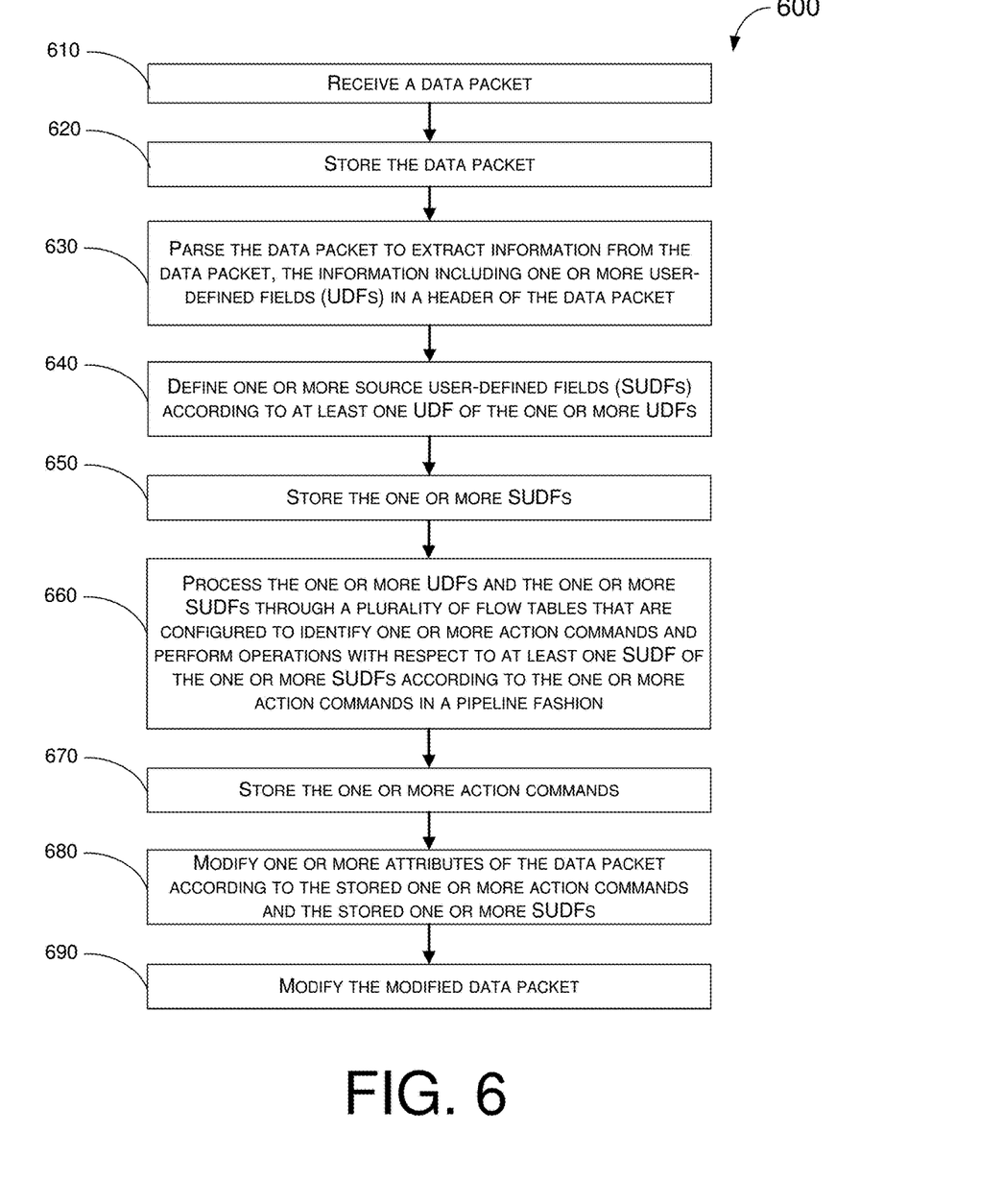
FIG. 6 is a flowchart of an example process in accordance with an implementation of the present disclosure.

FIG. 6 illustrates an example process 600 in accordance with an implementation of the present disclosure. Example process 600 may represent an aspect of implementing features of example architecture 100, example operation 200, example scenario 300 and/or example apparatus 400. Example process 600 may include one or more operations, actions, or functions as illustrated by one or more of blocks 610, 620, 630, 640, 650, 660, 670, 680 and 690. Although illustrated as discrete blocks, various blocks may be divided into additional blocks, combined into fewer blocks, or eliminated, depending on the desired implementation. Example process 600 may be implemented by example architecture 100 as well as example apparatus 400. Solely for illustrative purposes, the operations of example process 600 are described below in the context of example process 600 being performed by packet switch 405 of example apparatus 400. Example process 600 may begin at block 610.

At 610, example process 600 may involve packet switch 405 receiving a data packet. Block 610 may be followed by block 620.

At 620, example process 600 may involve packet switch 405 storing the data packet. Block 620 may be followed by block 630.

At 630, example process 600 may involve packet switch 405 parsing the data packet to extract information from the data packet, the information including one or more UDFs in a header of the data packet. Block 630 may be followed by block 640.

At 640, example process 600 may involve packet switch 405 defining one or more SUDFs according to at least one UDF of the one or more UDFs. Block 640 may be followed by block 650.

At 650, example process 600 may involve packet switch 405 storing the one or more SUDFs. Block 650 may be followed by block 660.

At 660, example process 600 may involve packet switch 405 processing the one or more UDFs and the one or more SUDFs through multiple flow tables that are configured to identify one or more action commands and perform operations with respect to at least one SUDF of the one or more SUDFs according to the one or more action commands in a pipeline fashion. Block 660 may be followed by block 670.

At 670, example process 600 may involve packet switch 405 storing the one or more action commands. Block 670 may be followed by block 680.

At 680, example process 600 may involve packet switch 405 modifying one or more attributes of the data packet according to the stored one or more action commands and the stored one or more SUDFs. Block 680 may be followed by block 690.

At 690, example process 600 may involve packet switch 405 outputting the modified data packet.

In some implementations, in modifying the one or more attributes of the data packet, example process 600 may involve packet switch 405 converting a format of the data packet from a first format to a second format. In some implementations, in converting the format of the data packet from the first format to the second format, example process 600 may involve packet switch 405 converting a format of a header of the data packet from a first header format to a second header format.

In some implementations, in defining the one or more SUDFs according to the at least one UDF of the one or more UDFs, example process 600 may involve packet switch 405 setting a value of a first SUDF of the one or more SUDFs based on a value of a first UDF of the one or more UDFs.

In some implementations, in performing the operations with respect to the at least one SUDF of the one or more SUDFs according to the one or more action commands, example process 600 may involve packet switch 405 performing one or more actions including, for example, setting a value of the at least one SUDF, increasing the value of the at least one SUDF, decreasing the value of the at least one SUDF, setting the value of the at least one SUDF as a value of a UDF of the one or more UDFs, and pushing the value of the at least one SUDF into a field in the data packet.

In some implementations, in identifying the one or more action commands comprises performing operations, example process 600 may involve packet switch 405 in each of the flow tables, determining whether there is a match between at least one UDF of the one or more UDFs and a respective predefined matching value associated with the flow table. For instance, by using a TCAM table, "default Action Command" may be obtained by a default entry, e.g., wildcard entry, even with no UDF matched. Additionally, example process 600 may involve packet switch 405 storing at least one action command in response to a determination that there is at least one UDF of the one or more UDFs matching the respective predefined matching value.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving a data packet;
modifying one or more attributes of the data packet through a pipeline of multiple flow tables, the modifying comprising:
extracting information from the data packet, the information including one or more user-defined fields (UDFs) in a header of the data packet;
identifying, by each flow table of the pipeline of multiple flow tables, respective one or more action commands;
storing the identified one or more action commands from each flow table of the pipeline of multiple flow tables as a plurality of collected action commands;
modifying one or more values in the data packet according to the collected action commands;
defining one or more source user-defined fields (SUDFs) according to at least one UDF of the one or more UDFs; and
executing, by each flow table of the pipeline of multiple flow tables, the respective one or more identified action commands to perform one or more actions with respect to at least one SUDF of the one or more SUDFs and at least one UDF of the one or more UDFs; and
outputting the modified data packet,
wherein the modifying of the one or more attributes of the data packet through the pipeline of multiple flow tables further comprises:
modifying the one or more UDFs and the one or more SUDFs by one flow table of the flow tables; and
providing a result of the modifying from the one flow table to a subsequent flow table of the flow tables in a sequential manner.

2. The method of claim 1, wherein the modifying of the one or more attributes of the data packet comprises converting a format of the data packet from a first format to a second format.

3. The method of claim 2, wherein the converting of the format of the data packet from the first format to the second format comprises converting a format of a header of the data packet from a first header format to a second header format.

4. The method of claim 1, wherein the modifying of the one or more attributes of the data packet comprises modifying at least one of a format, a packet header, or a length of the data packet.

5. The method of claim 1, wherein the defining of the one or more SUDFs according to the at least one UDF of the one or more UDFs comprises setting a value of a first SUDF of the one or more SUDFs based on a value of a first UDF of the one or more UDFs.

6. The method of claim 1, wherein the performing of the one or more actions with respect to the at least one SUDF of the one or more SUDFs comprises:
   identifying one or more action commands; and
   executing the one or more action commands with respect to the at least one SUDF.

7. The method of claim 6, wherein the executing of the one or more action commands with respect to the at least one SUDF comprises performing one or more actions comprising setting a value of the at least one SUDF, increasing the value of the at least one SUDF, decreasing the value of the at least one SUDF, setting the value of the at least one SUDF as a value of a UDF of the one or more UDFs, and pushing the value of the at least one SUDF into a field in the data packet.

8. The method of claim 6, wherein the identifying of the one or more action commands comprises:
   processing the one or more UDFs and the one or more SUDFs through the pipeline of multiple flow tables;
   in each of the flow tables, determining whether there is a match between at least one UDF of the one or more UDFs and a respective predefined matching value associated with the flow table; and
   storing at least one action command in response to a determination that there is at least one UDF of the one or more UDFs matching the respective predefined matching value.

9. A method, comprising:
   receiving a data packet;
   storing the data packet;
   parsing the data packet to extract information from the data packet, the information including one or more user-defined fields (UDFs) in a header of the data packet;
   defining one or more source user-defined fields (SUDFs) according to at least one UDF of the one or more UDFs;
   storing the one or more SUDFs;
   processing the one or more UDFs and the one or more SUDFs through a pipeline of multiple flow tables that are configured to identify one or more action commands and perform operations with respect to at least one SUDF of the one or more SUDFs according to the one or more action commands in a pipeline fashion;
   storing the one or more action commands as a plurality of collected action commands;
   modifying one or more attributes of the data packet through the pipeline of multiple flow tables according to the stored one or more action commands and the stored one or more SUDFs by:
      modifying one or more values in the data packet according to the collected action commands; and
      executing, by each flow table of the pipeline of multiple flow tables, the respective one or more identified action commands to perform one or more actions with respect to at least one SUDF of the one or more SUDFs and at least one UDF of the one or more UDFs; and
   outputting the modified data packet,
   wherein the modifying of the one or more attributes of the data packet through the pipeline of multiple flow tables further comprises:
      modifying the one or more UDFs and the one or more SUDFs by one flow table of the flow tables; and
      providing a result of the modifying from the one flow table to a subsequent flow table of the flow tables in a sequential manner.

10. The method of claim 9, wherein the modifying of the one or more attributes of the data packet comprises converting a format of the data packet from a first format to a second format.

11. The method of claim 10, wherein the converting of the format of the data packet from the first format to the second format comprises converting a format of a header of the data packet from a first header format to a second header format.

12. The method of claim 9, wherein the defining of the one or more SUDFs according to the at least one UDF of the one or more UDFs comprises setting a value of a first SUDF of the one or more SUDFs based on a value of a first UDF of the one or more UDFs.

13. The method of claim 9, wherein the performing of the operations with respect to the at least one SUDF of the one or more SUDFs according to the one or more action commands comprises performing one or more actions comprising setting a value of the at least one SUDF, increasing the value of the at least one SUDF, decreasing the value of the at least one SUDF, setting the value of the at least one SUDF as a value of a UDF of the one or more UDFs, and pushing the value of the at least one SUDF into a field in the data packet.

14. The method of claim 9, wherein the identifying of the one or more action commands comprises performing operations comprising:
   in each of the flow tables, determining whether there is a match between at least one UDF of the one or more UDFs and a respective predefined matching value associated with the flow table; and
   storing at least one action command in response to a determination that there is at least one UDF of the one or more UDFs matching the respective predefined matching value.

15. An apparatus, comprising:
   a packet switch configured to receive a data packet and output a modified version of the data packet, the packet switch comprising:
      a parser configured to parse the data packet to extract information from the data packet, the information including one or more user-defined fields (UDFs) in a header of the data packet, the parser also configured to define one or more source user-defined fields (SUDFs) according to at least one UDF of the one or more UDFs;
      a memory device configured to store a pipeline of multiple flow tables, the flow tables configured to identify one or more action commands and perform operations with respect to at least one SUDF of the one or more SUDFs according to the one or more action commands;
      a command collector configured to receive and store the one or more action commands from the flow tables;
      a packet buffer configured to store the data packet;
      a rewrite data vector module configured to receive and store the one or more SUDFs from the parser; and
      a packet modifier coupled to receive the data packet, the one or more action commands and the one or more SUDFs from the packet buffer, the command collector and the rewrite data vector, respectively, the packet modifier configured to modify one or more attributes of the data packet by modifying one or more values of the data packet through the pipeline of multiple flow tables according to the one or more action commands and the one or more SUDFs to provide the modified version of the data packet, wherein the modifying of the one or more attributes of the data packet through the pipeline of multiple flow tables comprises:

modifying the one or more UDFs and the one or more SUDFs by one flow table of the flow tables; and providing a result of the modifying from the one flow table to a subsequent flow table of the flow tables in a sequential manner, and wherein, in modifying the one or more attributes of the data packet, the packet modifier performs two or more of:

decreasing or increasing a value of a given SUDF;

writing a value of the given SUDF into a first position within the data packet, the first position mapped according to a respective UDF of the given SUDF; and inserting the value of the given SUDF into a second position within the data packet, the second position mapped according to the respective UDF of the given SUDF.

16. The apparatus of claim 15, wherein, in modifying the one or more attributes of the data packet, the packet modifier is configured to convert a format of the data packet from a first format to a second format.

17. The apparatus of claim 16, wherein, in converting the format of the data packet from the first format to the second format, the packet modifier is configured to convert a format of a header of the data packet from a first header format to a second header format.

18. The apparatus of claim 15, wherein, in defining the one or more SUDFs according to the at least one UDF of the one or more UDFs, the parser is configured to set a value of a first SUDF of the one or more SUDFs based on a value of a first UDF of the one or more UDFs.

19. The apparatus of claim 15, wherein, in performing the operations with respect to the at least one SUDF of the one or more SUDFs according to the one or more action commands, the flow tables are configured to perform one or more actions comprising setting a value of the at least one SUDF, increasing the value of the at least one SUDF, decreasing the value of the at least one SUDF, setting the value of the at least one SUDF as a value of a UDF of the one or more UDFs, and pushing the value of the at least one SUDF into a field in the data packet.

20. The apparatus of claim 15, wherein, in identifying the one or more action commands, the flow tables are configured to perform operations comprising:

in each of the flow tables, determining whether there is a match between at least one UDF of the one or more UDFs and a respective predefined matching value associated with the flow table; and storing at least one action command in response to a determination that there is at least one UDF of the one or more UDFs matching the respective predefined matching value.

21. The apparatus of claim 15, wherein the plurality of flow tables are configured to identify the one or more action commands and perform the operations with respect to the at least one SUDF of the one or more SUDFs according to the one or more action commands in a pipeline fashion.

22. The apparatus of claim 15, wherein the memory devices comprises a ternary content addressable memory (TCAM) configured to implement a TCAM flow table that performs wildcard searches.

23. The apparatus of claim 22, wherein the TCAM flow table is configured to perform default look-up result, search one or more missed entries, or both.

24. The apparatus of claim 22, wherein the TCAM flow table is configured to obtain a default action command with a default entry in an event that there is no UDF matched.

25. The apparatus of claim 24, wherein the default entry comprises a wildcard entry.

* * * * *